United States Patent [19]

Kluttz et al.

[11] Patent Number: 4,761,448

[45] Date of Patent: Aug. 2, 1988

[54] STABILIZED CRYSTALLINE POLYMERS

[75] Inventors: Robert Q. Kluttz, Houston; Richard A. Kemp, Stafford; Robert C. Ryan, Houston, all of Tex.

[73] Assignee: Shell Oil Company, Houston, Tex.

[21] Appl. No.: 102,467

[22] Filed: Sep. 29, 1987

[51] Int. Cl.$^4$ ............................................. C08K 5/05
[52] U.S. Cl. .................................... 524/381; 524/612
[58] Field of Search .............................. 524/381, 612

[56] References Cited

U.S. PATENT DOCUMENTS

| | | | |
|---|---|---|---|
| 2,495,286 | 1/1950 | Brubaker | 528/392 |
| 3,694,412 | 9/1972 | Nozaki | 528/392 |
| 3,925,307 | 12/1975 | Dahl et al. | 524/403 |
| 4,670,498 | 6/1987 | Furusawa et al. | 524/381 |

FOREIGN PATENT DOCUMENTS

| | | |
|---|---|---|
| 0121965 | 10/1984 | European Pat. Off. . |
| 0181014 | 5/1986 | European Pat. Off. . |
| 1081304 | 8/1967 | United Kingdom . |

*Primary Examiner*—Lewis T. Jacobs

[57] ABSTRACT

The melting point and the apparent degree of crystallinity of a linear alternating polymer of carbon monoxide and at least one ethylenically unsaturated hydrocarbon are stabilized against undue lowering during melt processing by inclusion within the polymer of an aluminum tri-alkoxide or hydrolysis product thereof.

25 Claims, No Drawings

STABILIZED CRYSTALLINE POLYMERS

FIELD OF THE INVENTION

This invention relates to stabilized linear alternating polymers of carbon monoxide and at least one ethylenically unsaturated hydrocarbon. More particularly, the invention relates to polymers of improved melt processing stability during procedures which involve melting and subsequent solidification of the polymer.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, e.g., peroxy compounds. U.K. Pat. No. 1,081,304 disclosed the production of related polymers of increased carbon monoxide content in the presence of alkylphosphine complexes of palladium salts as catalysts. Nozaki extended this process through the use of arylphosphine complexes of palladium salts and certain inert solvents, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest, in part because of the greater availability of such materials. The polymers, generally known as polyketones, have been shown to be of the formula —CO—(A)— where A is the moiety of ethylenically unsaturated hydrocarbon polymerized through the ethylenic linkage. For example, when the polymer is a copolymer of carbon monoxide and ethylene, the polymer is represented by the formula —CO—(CH$_2$—CH$_2$)—. A preferred general process for the production of these linear alternating polymers is illustrated by published European Patent Application Nos. 0,121,965 and 0,181,014. The process generally involves a catalyst composition formed from a Group VIII metal selected from palladium, cobalt or nickel, the anion of a non-hydrohalogenic acid having a pKa below 2 and a bidentate ligand of phosphorus, arsenic or antimony. The resulting polymers are relatively high molecular weight thermoplastic polymers having utility in the production of structural articles such as containers for food and drink and parts for the automotive industry.

The polymers are characterized by relatively high melting points, frequently over 200° C., depending upon the molecular weight and the chemical nature of the polymers. A melting point of this magnitude is of value in many applications, particularly when a shaped article is to be subjected to conditions of elevated temperature. However, when a polyketone polymer is subjected to the high temperatures required for melt processing, chemical changes can occur such as crosslinking, chain scission and formation of undesirable degradation products which can cause loss of attractive physical properties. These changes are particularly apparent in the melting point and the percentage of crystalline versus amorphous polymer as measured by differential scanning calorimetry (DSC). It is desirable that polyketone compositions should not undergo changes in physical properties during melt processing procedures. Stabilization of the percent crystallinity and melting point of the polymer is an indication of stabilization of other physical properties.

It would be of advantage to provide polyketone compositions whose melting point is relatively constant throughout one or more melt processing operations. It would be of advantage to provide polyketone compositions whose percent crystallinity has been stabilized against loss during melting-solidification of the polymer composition.

SUMMARY OF THE INVENTION

It has now been found that compositions comprising linear alternating polymers of carbon monoxide and at least one ethylenically unsaturated exhibit improved melt processability as evidenced by an apparent crystallinity which has been stabilized against loss when mixed with an aluminum tri-alkoxide or aluminum-containing hydrolysis product thereof. It has been found that polyketone compositions comprising polyketone polymer and aluminum tri-alkoxide or aluminum-containing hydrolysis products thereof exhibit stability of apparent crystallinity and relative stability of melting point through one or more melt processing operations which incorporate the melting and subsequent solidification of the polymer composition.

DESCRIPTION OF THE INVENTION

The polymers which are employed in the compositions of the invention are the linear alternating polymers of carbon monoxide and at least one ethylenically unsaturated hydrocarbon which are often referred to as polyketones. Suitable ethylenically unsaturated hydrocarbons for use in the polymers have from 2 to 20 carbon atoms inclusive, preferably from 2 to 10 carbon atoms inclusive, which are aliphatic hydrocarbons such as ethylene as well as other α-olefins including propylene, butene-1, octene-1 and dodecene-1, or are arylaliphatic containing an aryl substituent on an otherwise aliphatic molecule, particularly an aryl substituent on a carbon atom of the ethylenic unsaturation. Illustrative of this latter class are styrene, p-methylstyrene, p-ethylstyrene and m-methylstyrene. Preferred polyketone polymers are copolymers of carbon monoxide and ethylene or terpolymers of carbon monoxide, ethylene and a second α-olefin, i.e., an α-olefin of 3 or more carbon atoms, particularly propylene.

Of partiuclar interest are those polymers of molecular weight from about 1,000 to about 200,000, particularly those of molecular weight from about 10,000 to about 50,000, and containing substantially equimolar quantities of carbon monoxide and unsaturated hydrocarbon.

Such polymers are produced by contacting the carbon monoxide and unsaturated hydrocarbon(s) under polymerization conditions in the presence of a catalytic amount of a catalyst composition formed from a compound of the Group VIII metals palladium, cobalt or nickel, an anion of a non-hydrohalogenic acid having a pKa less than about 6, preferably less than about 2, and a bidentate ligand of phosphorus, arsenic or antimony. Although the scope of the polymerization process is extensive, for purposes of illustration the preferred Group VIII metal compound is palladium acetate, the preferred anion is the anion of trifluoroacetic acid or p-toluenesulfonic acid, and the preferred bidentate ligand is 1,3-bis(diphenylphosphino)propane.

Polymerization is typically carried out at elevated temperature and pressure and in the gaseous phase or in the liquid phase in the presence of an inert diluent, particularly a lower alkanol such as methanol or ethanol. The reactants are contacted by conventional methods such as shaking or stirring and subsequent to reaction the polymer product is typically recovered by filtration or decantation. The polymer product may contain residues of the catalyst which are removed, if desired, by contacting with a solvent which is selective for the residues. Production of this class is illustrated, for example, by published European Patent Application Nos. 0,121,965 and 0,181,014.

The structure of the preferred polymer is that of a linear alternating polymer of carbon monoxide and unsaturated hydrocarbon, e.g., ethylene or ethylene and propylene. The polymer will contain substantially one carbon monoxide moiety for each moiety of unsaturated hydrocarbon. When terpolymers of carbon monoxide and ethylene and a second ethylenically unsaturated hydrocarbon are produced, there will be at least about 2 units incorporating a moiety of ethylene for each unit incorporating a moiety of the second hydrocarbon. Preferably there are about 10 to about 100 units incorporating a moiety of ethylene per unit incorporating a moiety of the second hydrocarbon. The polymer chain of the preferred class of polymers is thus represented by the formula

wherein B is the moiety obtained by polymerization of the second α-olefin of 3 to 20 carbon atoms through the ethylenic unsaturation. The $-CO-(CH_2-CH_2)-$ units and the $-CO-(B)-$ units occur randomly throughout the polymer chain and the ratio of y:x is no more than about 0.5. In the modification of the invention which employs copolymers of carbon monoxide and ethylene without the presence of a second hydrocarbon, the polymers are represented by the above formula wherein $y=0$. When y is other than 0, i.e., terpolymers are employed, ratios of y:x from about 0.01 to about 0.1 are preferred. The polymer chain will have end groups which depend upon the particular materials present during polymerization and how the polymer is processed during any subsequent purification. The precise nature of such end groups or "caps" is not critical, however, and the polymeric polyketones are fairly depicted by the description of the polymer chain.

The compositions of the invention comprise an intimate mixture of the polyketone polymer and aluminum alkoxide or aluminum-containing hydrolysis product thereof. The precise form of the aluminum species present in the final composition is not known with certainty and may depend upon a number of factors including the degree of moisture in the polymer with which the aluminum trialkoxide is mixed, whether or not the composition has been exposed to moisture as by contact with a humid environment, the temperature to which the polymer composition has been raised and the number of times the composition has been thermally processed. It is known that the aluminum alkoxides are quite sensitive to moisture so that unless substantial precautions are taken to insure that the composition remains dry, the aluminum tri-alkoxide will hydrolyze, probably to species containing aluminum and hydroxyl moieties. At elevated temperatures, thermolysis of the aluminum tri-alkoxide may occur and this process is also considered to give species containing aluminum and hydroxyl moieties. Insofar as the aluminum species is likely the same regardless of whether hydrolysis or thermolysis takes place, despite different organic products, the term aluminum-containing hydrolysis product is employed to indicate the aluminum-containing species of either type of aluminum tri-alkoxide decomposition. However, when the stabilizer is provided in the form of an aluminum tri-alkoxide, whatever hydrolysis or thermolysis takes place is not considered to detract from the advantages of stabilization of the polymer.

The aluminum tri-alkoxide employed as the source of the aluminum species incorporates three identical alkoxide moieties or alternatively contains two or three different alkoxide species and has from 3 to 36 carbon atoms inclusive, preferably from 3 to 12. The alkoxide species are derived from primary, secondary or tertiary alcohols. The aluminum alkoxide is therefore represented by the formula

wherein R independently is alkyl of up to 12 carbon atoms, preferably up to 4, and is primary, secondary or tertiary alkyl. Illustrative of primary alkyl are methyl, ethyl, n-propyl, isobutyl, n-octyl, 2-ethyhexyl, n-dodecyl and n-decyl, while secondary alkyl substituents include isopropyl, sec-butyl 2,4-dimethyl-2-butyl and 2-ethyl-2-octyl. Tertiary alkyl radicals are illustrated by tert-butyl and tert-amyl. In general, secondary alkyl groups are preferred over either the primary or the tertiary alkyl groups and particularly preferred are those aluminum alkoxides incorporating three identical secondary alkoxide groups. Illustrative of such alkoxides are aluminum tri-isopropoxide, aluminum tri-sec-butoxide and aluminum tri-sec-octoxide. Aluminum tri-isopropoxide is a particularly preferred species.

The amount of aluminum alkoxide to be employed is a stabilizing quantity. Amounts from about 0.01% by weight to about 10% by weight based on the total composition are satisfactory with quantities from about 0.05% by weight to about 1% by weight on the same basis being preferred.

The method of mixing the polymer and the aluminum alkoxide is not critical so long as an intimate mixture is obtained. In one modification, the aluminum alkoxide is dissolved in a suitable solvent as illustrated by hydrocarbons, e.g., benzene and toluene, lower alkanols such as methanol and ethanol or carbonylic solvents such as acetone or methyl ethyl ketone. The polymer in a particulate form is added and the solvent removed as by evaporation to provide the polymer composition as a residue. Best results are obtained if the composition is agitated during solvent removal by shaking or rotating of the container in which the composition is formed. In an alternate modification, the polymer in a finely divided form is mixed with an aluminum tri-alkoxide powder and the resulting mixture is passed through an extruder. Whatever the ultimate aluminum-containing species in the composition might be, the aluminum is preferably provided to the composition as the aluminum tri-alkoxide.

The resulting compositions will have an improved melt processability as evidenced by a relatively constant apparent crystallinity and relatively constant melting points and crystallization temperatures, as well as by relatively constant high heats of crystallization when subjected to melt processing operations of melting and solidification. Retention of an apparent crystallinity during melt processing indicates that the crystallinity of a polymer composition subsequent to processing is not significantly lower than the crystallinity prior to melt processing. Polymers which are not stabilized against loss of apparent crystallinity exhibit melting points, crystallization temperatures and heats of crystallization which decrease, in some cases substantially decrease, upon melt processing. This decrease of melting point and crystallization temperature, although possibly due to a number of factors, is a measure of the loss of apparent crystallinity with the magnitude of the temperature decrease being some measure of the loss of apparent crystallinity. A decrease in heat of crystallization upon melt processing is a more direct measure of loss of apparent crystallinity.

This improvement in melt processability, as evidenced by stability of apparent crystallinity and relatively constant melting points, offers considerable advantages which are not to be found in unstabilized polymers. For example, a stabilized polymer composition may be converted into nibs by the use of an extruder. The nibs are then suitably injection molded to produce an article without substantial decrease in melting point of the polymeric composition. The composition of the invention are particularly useful in this and other instances where melt processing to the desired product requires a series of melting and solidification cycles. While the compositions are usefully processed by conventional techniques which do not require melting and solidification of the polymer, the advantages of the compositions are most apparent when melt processing operations which do involve melting and solidification of the polymer are employed.

The compositions of the invention stabilized against loss of apparent crystallinity may optionally contain other conventional additives which do not serve to unnecessarily reduce the melting point or apparent degree of crystallinity. Such additives include antioxidants, blowing agents and mold release agents which are added to the polymer by blending, milling or other conventional methods prior to, subsequent to or together with the aluminum alkoxide.

The compositions of the invention are useful for the variety of applications of a premium thermoplastic as is now known in the art. The compositions are particularly useful in the production of articles which typically require one or more melting-solidification cycles in their production. Illustrative of such articles are containers for food and drink, shaped parts for the automobile industry, wires and cables and structural articles for construction applications.

The invention is further illustrated by the following Illustrative Embodiments which should not be construed as limiting the invention.

PROCEDURE

In the following Illustrative Embodiments, measurements of melting points and crystallization temperatures, or alternatively heats of melting and heats of fusion, were made by the use of a Perkin-Elmer DSC 7 differential scanning calorimeter (DSC) which employs samples of polymer or polymer composition in sealed pan containers. The pan and contents are heated at a controlled rate, typically 20° C./minute, until the sample has melted. The pan and contents are then cooled until the sample has solidified and then heated, past a second melting point, to 285° C. at which temperature the sample is maintained for 10 minutes. The pan and contents are then cooled until the sample has solidified a second time. The melting and crystallization temperatures are defined as the temperatures at which the heat flow reaches a maximum (for melting) or a minimum (for crystallization). Typically the melting point, Tm, will be higher than the crystallization temperature, Tc. Although a number of factors influence the melting point and crystallization temperature, these values are also influenced by the crystallinity of the polymer. In general, the smaller the difference between the first and second melting points, the greater the degree of retained crystallinity. The same relationship is generally true for the crystallization temperatures.

It is also possible to determine through the use of the DSC the magnitude of the first and second heats of melting ($H_1$ and $H_2$) and the first and second heats of crystallization ($C_1$ and $C_2$) for the polymer without aluminum tri-alkoxide and also for the stabilized polymer composition. In general, the heats of crystallization for the stabilized composition will be higher than the corresponding values for the unstabilized polymer. The greater this difference is, the greater the degree of crystallinity which has been retained in the polymeric composition.

In the Illustrative Embodiments, temperatures are measured in °C. and heats are measured in cal/g.

Samples to be evaluated were prepared by several different procedures. In one method, aluminum tri-isopropoxide was deposited upon a linear alternating polymer of carbon monoxide and at least one ethylenically unsaturated hydrocarbon by dissolving the alkoxide in toluene and adding polymer in particulate form. The toluene was then removed by evaporation on a rotary evaporator to leave a coating of aluminum tri-isopropoxide on the polymer particles. Samples produced in this manner are designated "A" in the Illustrative Embodiments which follow. The A samples were on occasion divided with one portion being kept under vacuum and the other portion maintained under 100% humidity for several days. These samples are designated AD and AW respectively.

Other samples were prepared by powder blending. Aluminum tri-isopropoxide powder was shaken with the polymer in powdered form and the resulting mixture was extruded to produce nibs. Samples produced in this manner are termed "B" in the Illustrative Embodiments which follow. On occasion these B samples were divided with one portion maintained under vacuum and the other maintained under a relative humidity of 100% for several days. These samples are designated BD and BW respectively.

ILLUSTRATIVE EMBODIMENT I

A linear alternating terpolymer of carbon monoxide, ethylene and propylene was produced employing a catalyst composition formed from palladium acetate, the anion of trifluoroacetic acid and 1,3-bis-(diphenylphosphino)propane. Samples of this polymer were evaluated in the DSC as a standard along with samples of stabilized composition produced by the above methods. The results are shown in Tables IA and IB.

TABLE IA

| Sample Preparation | % Alkoxide in Sample | TM1 | TC1 | TM2 | TC2 |
|---|---|---|---|---|---|
| Standard | 0 | 232 | 167 | 224 | 155 |
| AW | 0.5 | 232 | 176 | 228 | 167 |
| AD | 0.5 | 231 | 178 | 226 | 170 |
| BW | 0.1 | 235 | 173 | 230 | 160 |
| BD | 0.1 | 234 | 175 | 226 | 162 |
| BW | 1.0 | 227 | 178 | 226 | 169 |

TABLE IA-continued

| Sample Preparation | % Alkoxide in Sample | TM1 | TC1 | TM2 | TC2 |
|---|---|---|---|---|---|
| BD | 1.0 | 232 | 178 | 227 | 169 |

Temperatures reported in degrees Celcius

TABLE IB

| Sample Preparation | % Alkoxide in Sample | H1 | C1 | H2 | C2 |
|---|---|---|---|---|---|
| Standard | 0 | * | 17.3 | 20.0 | 13.9 |
| AW | 0.5 | 21.9 | 19.7 | 21.3 | 17.0 |
| AD | 0.5 | 20.3 | 20.0 | 21.3 | 18.1 |
| BW | 0.1 | 19.3 | 18.2 | 19.1 | 15.4 |
| BD | 0.1 | 20.0 | 19.9 | 20.0 | 17.4 |
| BW | 1.0 | 20.0 | 19.6 | 20.3 | 17.7 |
| BD | 1.0 | 20.8 | 20.0 | 21.1 | 17.5 |

*The first heat of melting of the standard could not be accurately determined in these experiments because of the physical form of the sample. The first heat of melting of this standard is known to be about 20 cal/g from other experiments. heats are reported in calories/gram

ILLUSTRATIVE EMBODIMENT II

A linear alternating terpolymer of carbon monoxide, ethylene and propylene was produced employing a catalyst formed from palladium acetate, the anion of trifluoroacetic acid and 1,3-bis(diphenylphosphino)propane. Samples were prepared by the above procedures and evaluated, together with a standard, in the DSC. The results are shown in Tables IIA and IIB.

TABLE IIA

| Sample Preparation | % Alkoxide in Sample | TM1 | TC1 | TM2 | TC2 |
|---|---|---|---|---|---|
| Standard | 0 | 230 | 159 | 214 | 142 |
| AW | 0.5 | 228 | 168 | 220 | 161 |
| AD | 0.5 | 232 | 171 | 227 | 163 |

TABLE IIB

| Sample Preparation | % Alkoxide in Sample | H1 | C1 | H2 | C2 |
|---|---|---|---|---|---|
| Standard | 0 | * | 14.5 | 15.7 | 10.7 |
| AW | 0.5 | 18.4 | 17.7 | 20.4 | 15.6 |
| AD | 0.5 | 20.1 | 17.7 | 18.7 | 15.4 |

*The first heat of melting of the standard could not be accurately determined in these experiments because of the physical form of the sample. The first heat of melting of this standard is known to be about 20 cal/g from other experiments.

ILLUSTRATIVE EMBODIMENT III

A linear alternating copolymer of carbon monoxide and ethylene was produced employing a catalyst formed from palladium acetate, the anion of trifluoroacetic acid and 1,3-bis(diphenylphosphino)propane. A sample containing aluminum tri-isopropoxide was produced according to the BW procedure above and evaluated in the DSC against the copolymer as a standard. The results are shown in Tables IIIA and IIIB.

TABLE IIIA

| Sample Preparation | % Alkoxide in Sample | TM1 | TC1 | TM2 | TC2 |
|---|---|---|---|---|---|
| Standard | 0 | 254 | 196 | 248 | 179 |
| BW | 0.1 | 252 | 208 | 246 | 201 |

TABLE IIIB

| Sample Preparation | % Alkoxide in Sample | H1 | C1 | H2 | C2 |
|---|---|---|---|---|---|
| Standard | 0 | * | 25.8 | 28.6 | 20.8 |
| BW | 0.1 | 27.5 | 25.1 | 28.7 | 20.7 |

*The first heat of melting of the standard could not be accurately determined in these experiments because of the physical form of the sample. The first heat of melting of this standard is known from other experiments to be about 20 cal/g.

Although the retention of degree of crystallinity is not as great for the copolymer of this Illustrative Embodiment as that for the terpolymers of the other Illustrative Embodiments, if larger percentages of aluminum tri-isopropoxide are added to the polymer, a greater degree of retention of crystallinity will be observed.

What is claimed is:

1. A composition stabilized against the loss of apparent crystallinity during melt processing which comprises a linear alternating polymer of carbon monoxide and at least one ethylenically unsaturated hydrocarbon and a stabilizing quantity of aluminum tri-alkoxide or aluminum-containing hydrolysis product thereof.

2. The composition of claim 1 wherein the polymer is represented by the formula

wherein B is the moiety of an α-olefin of 3 to 20 carbon atoms inclusive polymerized through the ethylenic unsaturation, and the ratio of y:x is no more than about 0.5.

3. The composition of claim 2 wherein the α-olefin of 3 to 20 carbon atoms inclusive is propylene.

4. The composition of claim 3 wherein the aluminum tri-alkoxide is represented by the formula Al(OR)$_3$ wherein R independently is alkyl of up to 12 carbon atoms.

5. The composition of claim 4 wherein the aluminum tri-alkoxide incorporated three identical secondary alkoxide groups of up to 4 carbon atoms.

6. The composition of claim 5 wherein y=0.

7. The composition of claim 5 wherein the ratio of y:x is from about 0.01 to about 0.1.

8. The composition of claim 7 wherein the aluminum tri-alkoxide is aluminum tri-isopropoxide.

9. A process for stabilizing a linear alternating polymer of carbon monoxide and at least one ethylenically unsaturated hydrocarbon against loss of apparent crystallinity during melt processing by incorporating in said polymer a stabilizing quantity of aluminum alkoxide or aluminum-containing hydrolysis product thereof.

10. The process of claim 9 wherein the aluminum tri-alkoxide is represented by the formula Al(OR)$_3$ wherein R independently is alkyl of up to 12 carbon atoms.

11. The process of claim 10 wherein R is secondary alkyl of up to 4 carbon atoms.

12. The process of claim 11 wherein the polymer is represented by the formula

wherein B is the moiety of an α-olefin of 3 to 20 carbon atoms inclusive polymerized through the ethylenic unsaturation, and the ratio of y:x is no more than about 0.5.

13. The process of claim 12 wherein the α-olefin of 3 to 20 carbon atoms inclusive is propylene.

14. The process of claim 13 wherein the ratio of y:x is from about 0.01 to about 0.1.

15. The process of claim 14 wherein Al(OR)$_3$ is aluminum tri-isopropoxide.

16. A polymeric composition of matter as prepared in the process of claim 9.

17. A method of retaining a relatively high apparent crystallinity of a polymer during melt processing by (1) incorporating within the polymer, prior to melt processing, a stabilizing quantity of aluminum tri-alkoxide or aluminum-containing hydrolysis product thereof, (2) melt processing the resulting polymeric composition, and (3) recovering, upon solidification, polymer of relatively constant apparent crystallinity.

18. The method of claim 17 wherein the polymer is represented by the formula

wherein B is the moiety of an α-olefin of from 3 to 20 carbon atoms inclusive polymerized through the ethylenic unsaturation and the ratio of y:x is no more than about 0.5.

19. The method of claim 18 wherein the aluminum tri-alkoxide is represented by the formula Al(OR)$_3$ wherein R is alkyl of up to 12 carbon atoms.

20. The method of claim 19 wherein the ratio of y:x is from about 0.01 to about 0.1.

21. The method of claim 19 wherein y=0.

22. The method of claim 20 wherein R is secondary alkyl of up to 4 carbon atoms.

23. The method of claim 22 wherein R is isopropoxide.

24. A polymeric composition of matter as prepared in the method of claim 17.

25. A shaped article produced by the method of claim 17.